United States Patent [19]
André

[11] Patent Number: 5,428,605
[45] Date of Patent: Jun. 27, 1995

[54] METHOD AND ECHO CANCELLER FOR ECHO CANCELLATION WITH A NUMBER OF CASCADE-CONNECTED ADAPTIVE FILTERS

[75] Inventor: Tore M. André, Älvsjö, Sweden

[73] Assignee: Telefonaktiebolaget LM Ericsson, Stockholm, Sweden

[21] Appl. No.: 242,456

[22] Filed: May 13, 1994

[30] Foreign Application Priority Data

May 14, 1993 [SE] Sweden ................................ 9301666

[51] Int. Cl.⁶ .................................................. H04B 3/23
[52] U.S. Cl. ..................................... 370/32.1; 375/232; 379/410
[58] Field of Search ................. 370/32, 32.1; 379/410, 379/411; 375/14; 364/724.19

[56] References Cited

U.S. PATENT DOCUMENTS

| | | | |
|---|---|---|---|
| 4,574,166 | 3/1986 | Gritton | 370/32.1 |
| 4,956,838 | 9/1990 | Gilloire et al. | 370/32.1 |
| 4,965,823 | 10/1990 | Nakagawa et al. | 370/32.1 X |
| 4,972,467 | 11/1990 | Nakagawa et al. | 370/32.1 X |
| 5,189,637 | 2/1993 | Eriksson | 370/32.1 |

FOREIGN PATENT DOCUMENTS 174749  3/1986  European Pat. Off. .

OTHER PUBLICATIONS

Patent Abstracts of Japan, 60-5634.
Patent Abstracts of Japan, 1-129623.
Patent Abstracts of Japan, 62-51836.
IBM Technical Disclosure Bulletin, vol. 31, No. 10, Mar. 1989, pp. 157–158.

*Primary Examiner*—Melvin Marcelo
*Attorney, Agent, or Firm*—Burns, Doane, Swecker & Mathis

[57] ABSTRACT

Echo-cancellation with the aid of a number of cascade-connected adaptive filters, wherein each filter forms an output signal for cancelling its respective part of an echo signal appearing on a line included in a four-wire loop. The filters will preferably be able to converge rapidly, at least for relatively short impulse responses, and to provide effective echo-cancellation for different kinds of impulse response. Those filters which are required for the echo cancellation at that moment in time are ascertained by calculating a special quality measurement for each filter. There is formed an echo-reduced signal which is equal to the difference between the original, echo-included signal and the sum of the output signals from those filters that are needed for the echo-cancellation. These filters are updated with the echo-reduced signal, whereas the remainder of the filters are updated with signals formed as the difference between the echo-reduced signal and the output signal of respective filters.

11 Claims, 3 Drawing Sheets

METHOD AND ECHO CANCELLER FOR ECHO CANCELLATION WITH A NUMBER OF CASCADE-CONNECTED ADAPTIVE FILTERS

BACKGROUND

The present invention relates to echo cancellation with the aid of a number of cascade-connected adaptive filters, each of which produces an individual output signal for cancellation of a respective part of an echo signal appearing on a line which is included in a four-wire loop.

DESCRIPTION OF THE PRIOR ART

Echo cancellers have recently obtained greater importance with the introduction of digital mobile telephony. Digital mobile telephones give rise to a long delay which causes any echo that may be generated to be highly disturbing. The time taken for an echo canceller to adjust itself to cancel-out an echo is called convergence time. The convergence time of an echo canceller is an important parameter for the subjective speech quality and is sometimes considered to be the most important measurement of the quality of an echo canceller. An echo canceller which converged rapidly at least in the majority of cases, for instance in the case of local calls, would be an attribute under all circumstances.

Probably the adaptive algorithm most used for echo cancellers is the Normalized Least Mean Square algorithm, NLMS. Normally, a long FIR-filter is used so as to cover practically all occurrent impulse responses. A typical filter length is 512 taps, which provides a total possible impulse response of 64 ms. The filter output signal is subtracted from the signal which contains an echo in a known manner, whereafter the difference signal thus formed is used to update the filter. When applying the NLMS-method, the filter converges in about 300 ms.

In the majority of cases in practice, however, only a part of the filter coefficients are distanced from zero when the filter has converged. This applies particularly to local calls, since practically the whole of the impulse response of the echo path will then lie in the first 10–30 taps. In certain cases, the impulse response is preceded by a long delay, a so-called flat delay. Gliding windows represent one method proposed to reduce complexity and to decrease convergence time. This method is based on attempting to estimate the magnitude of a flat delay and thereafter placing the filter where the impulse response of the echo path lies, with the aid of a variable delay. The advantages of this method are that a relatively short filter which is also able to converge rapidly will suffice. The drawbacks are that the delay cannot be readily estimated and that it is not possible to cancel multiple echoes, i.e. several echoes having delays of mutually different values.

IBM Technical Disclosure Bulletin, Vol. 31, No. 10, March 1989, describes on pages 157–158 a multiple echo canceller. This echo canceller includes a number of relatively short filters coupled in a cascade. Each such filter generates an output signal which is subtracted from the signal that contains an echo in a manner such that the echo will be reduced successively with each filter, depending on the impulse response. There is thus formed a number of difference signals which are each used to update the filter in which it is formed. However, the ability of the echo canceller to cancel the echoes is limited because the filters do not always converge satisfactorily. This is because a filter in the cascade-connected filter chain will sometimes be disturbed by the echo that cannot be cancelled by this filter but which instead shall be cancelled by one or more filters which lie further away in the filter chain.

SUMMARY

The object of the present invention is to provide a method and an echo canceller with which echo cancellation is achieved with the aid of a number of cascade-connected filters. The filters shall be capable of converging rapidly, at least in the case of echo paths that have relatively short impulse responses, and shall also provide effective echo cancellation for different occurrent impulse responses, for instance impulse responses of mutually different lengths and impulse responses caused by multiple echoes. According to known principles, a rapid convergence can be replaced with a stable and secure convergence. Accordingly, when practicing the invention, it is also possible to obtain a stable and secure convergence which, is relatively rapid at the same time.

The aforesaid object is achieved by calculating for each filter a special quality-measurement so as to ascertain which filters are required for echo cancellation at that moment in time, wherein solely the output signals from such filters are enabled or coupled so as to be used actively to reduce the echo concerned. There is thus formed an echo-reduced signal which is equal to the difference between the original, echo-including signal and the sum of the output signals of those filters which are used actively for echo cancellation at that moment in time. All of these filters are updated with the echo-reduced signal, whereas those filters which are not used actively at that time are updated with signals which are equal to the difference between the echo-reduced signal and the output signal of respective filters.

BRIEF DESCRIPTION OF THE DRAWINGS

The invention will now be described in more detail with reference to the accompanying drawings, in which.

DETAILED DESCRIPTION

Figure 1:
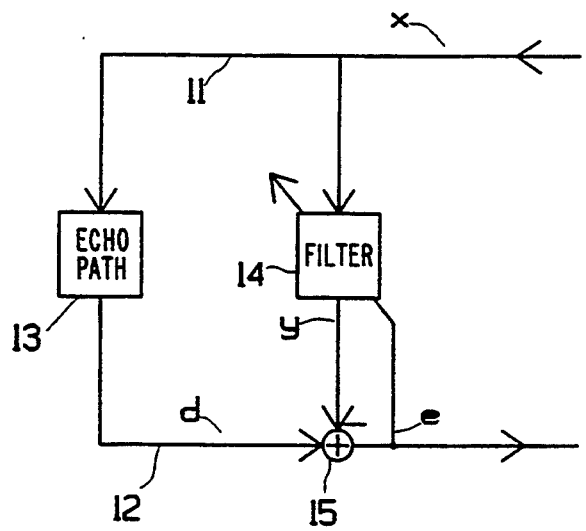
FIG. 1 illustrates a conventional echo canceller for cancelling echoes in a four-wire loop.

FIG. 1 illustrates a conventional echo canceller for cancelling echoes in a four-wire loop. Reference numerals 11 and 12 identify two lines included in a four-wire loop. The echo appears in an echo path represented by a block 13. A digital, adaptive filter 14 receives on its input a signal x which is also applied to the echo path 13. An echo estimate y is formed in the filter and is subtracted in a subtraction device 15 from an echo-including signal d on the line 12, thereby forming a difference signal e. The filter adjusts itself in a known manner, i.e. the filter coefficients are updated according to some appropriate adaptive algorithm with the aid of the difference signal e.

Figure 2:
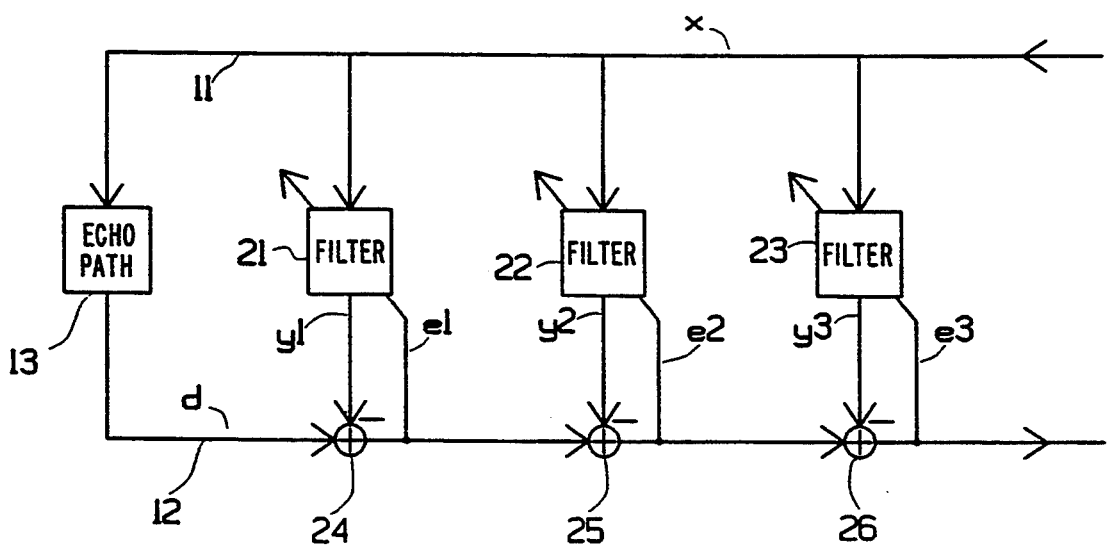
FIG. 2 illustrates a known echo canceller which includes a number of cascade-connected filters.

FIG. 2 illustrates a known echo canceller which includes a number of cascade-connected filters. The echo canceller should coincide with the echo canceller described in the aforesaid IBM Technical Disclosure Bulletin. As in the case with the echo canceller illustrated in FIG. 1, a signal x appears on an upper line 11 and an echo-included signal d appears on a lower line 12, the echo path being represented by a block 13 as in the earlier case. The filters are referenced 21–23 and their output signals y1-y3 are subtracted from the echo-included signal in subtraction means 24–26, whereby the echo is reduced successively with each filter in dependence on the impulse response of the echo path. There is formed thereby a number of difference signals, e1-e3, which are used to update their respective filters. The difference signals obtain the following values: e1=d−y1, e2=d−y1−y2, and so on.

As earlier mentioned, the filters are not always able to converge satisfactorily, however, because they are sometimes disturbed by echoes that shall actually be cancelled by one of the other filters.

Figure 3:
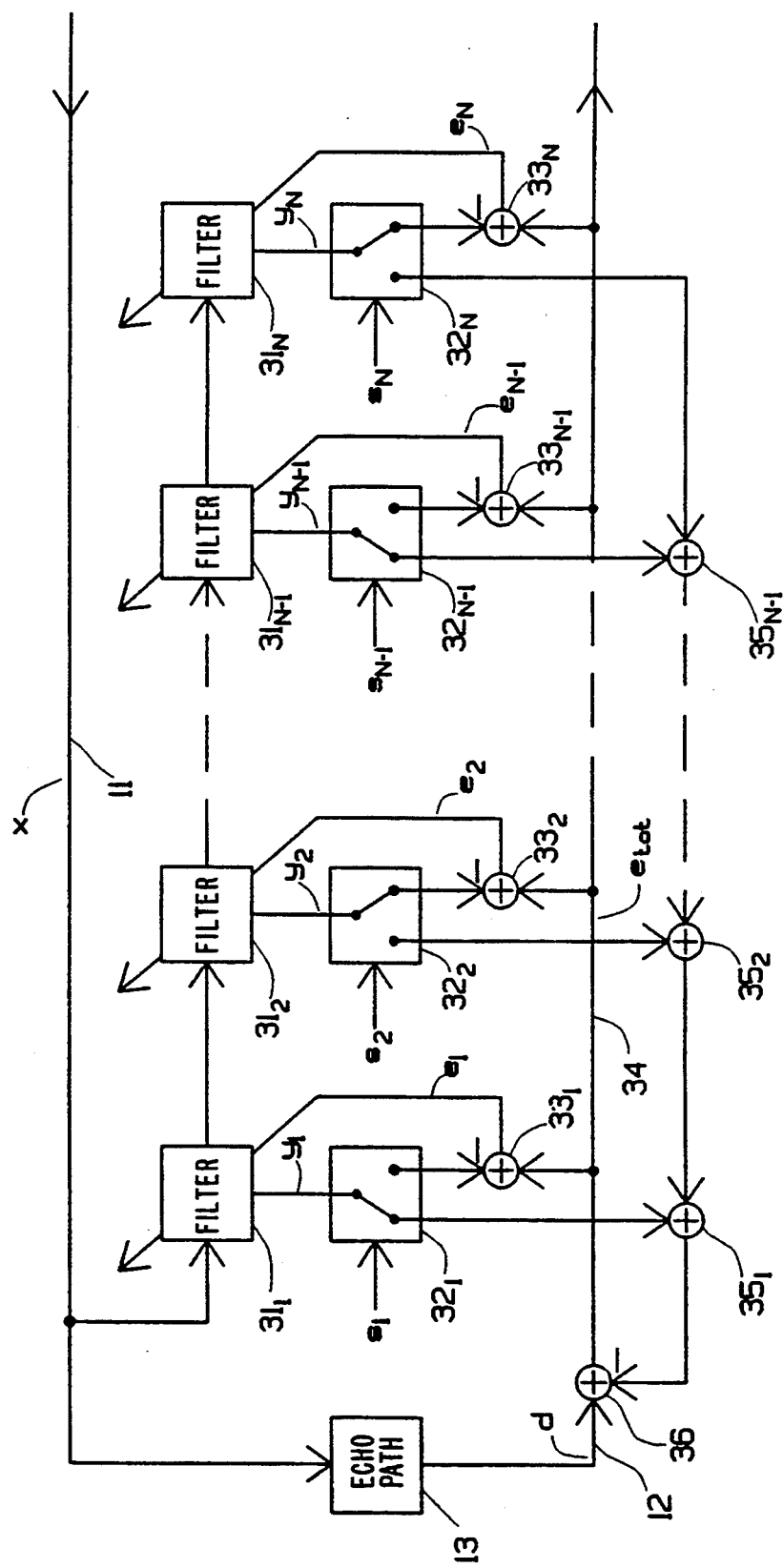
FIG. 3 illustrates an exemplifying embodiment of an inventive echo canceller.

FIG. 3 illustrates an example of an inventive echo canceller. Those means that find correspondence in FIGS. 1 and 2 have been referenced in the same way as said means. The illustrated echo canceller includes a number of cascade-connected filters $31_1$-$31_N$, which produce the output signals $y_1$-$y_N$. The filters will preferably be connected to the upper line, i.e. to line 11, principally in the same way as the filters in FIG. 2, even though it may seem that they are connected in some other way. This is explained by the fact that the filters in FIG. 2 should be connected to the line 11 via delays of mutually different lengths.

Each of the filter output signals is applied to a respective controllable switch $32_1$-$32_N$. There is provided for each of the switches a subtraction means $33_1$-$33_N$ whose negative input is connected to its respective switch, and whose positive input is connected to a line 34. The output signal from a filter whose switch is in its right-hand switching position, see for instance the switch $32_2$, is not used actively to reduce the echo, but merely functions to produce a filter updating error signal. The error signals for filters whose associated switch is in its right-hand switching position are formed in the subtraction means 33 as the difference between the signal on the line 34 and the filter output signal. In the illustrated case, this applies to the error signals $e_2$ and $e_N$. In an initial stage of a converging process, for instance at the beginning of a new telephone call, all switches occupy their right switching position. The following error signals are thereby obtained: $e_1=d-y_1$, $e_2=d-y_2$, and so on, because the echo-included signal d on the line 12 also appears on the line 34 in the initial stage. The signal on this line is called $e_{tot}$ for reasons made apparent hereinafter.

In the initial state, i.e. before a filter is enabled for use actively to cancel an echo, each of the filters adjust in an endeavour to cancel the total echo. In this regard, each of the filters converge to a certain level, because one filter, any filter, in the filter cascade will be disturbed generally by some part of the total echo that should actually be cancelled by one or more of the other filters.

A special quality measurement is calculated continuously for each filter, so as to be able to establish which filters perform useful work. In turn, the quality measurements, or values, are used to form switch control signals $s_1$-$s_N$. A description of how the quality measurements and the control signals are formed will be described in more detail later on with reference to FIG. 4. When the quality measurement of a filter exceeds a specific value, the filter concerned shall be coupled-in or enabled for use actively for echo cancellation, i.e. shall be activated for echo reduction, which in the illustrated case means that the switch shall be set to its left-hand switching position. If the quality measurement then falls beneath a second, lower value, the filter may optionally be disabled, i.e. the switch may optionally be reset to its right-hand switching position. It is also conceivable, however, to allow the enabled filter to remain enabled during the remainder of an ongoing call.

The output signals from those filters which, at that time, are enabled to reduce the echo are added in a number of addition means $35_1$-$35_{N-1}$. The resultant summation signal is subtracted from the echo-included signal d in a subtraction means 36, wherein an echo-reduced signal, $e_{tot}$, will appear on the line 34. In the illustrated example, the filters $31_1$ and $31_{N-1}$ are enabled so as to reduce the echo appearing in the signal d. The sum of the output signals of the enabled filters is, in this case, $y_1+y_{N-1}$, meaning that the echo-reduced signal $e_{tot}$ becomes equal to: $d-(y_1+y_{N-1})$. It will be understood that the output signals of the enabled filters may, instead, be subtracted from the signal d in a number of series-connected subtraction means between the lines 12 and 34.

Because the output signals of the enabled filters do not appear on the inputs of the subtraction means 33, all enabled filters will obtain equally as large error signals which coincide with the echo-reduced signal $e_{tot}$ on the line 34. This applies to the filters $31_1$ and $31_{N-1}$ in the illustrated case. The error signal for each of the not-enabled filters $31_2$ and $31_N$ is equal to the signal $e_{tot}$ decreased by the filter output signal. In the illustrated example, there is obtained:

$$e_1=e_{N-1}=e_{tot}=d-(y_1+y_{N-1})$$

$$e_2=e_{tot}-y_2=d-(y_1+y_2+y_{N-1})$$

$$e_N=e_{tot}-y_N=d-(y_1+y_{N-1}+y_N)$$

Thus, when a filter is enabled, its output signal will also be used to update the remaining filters. The fact that all enabled filters receive equally as large error signals, $e_{tot}$, all of the error signals of these filters can be caused to go down to zero or to the vicinity of zero, therewith providing effective echo cancellation. None of the filters will be disturbed by any part of the total echo that shall be cancelled by other filters.

Figure 4:
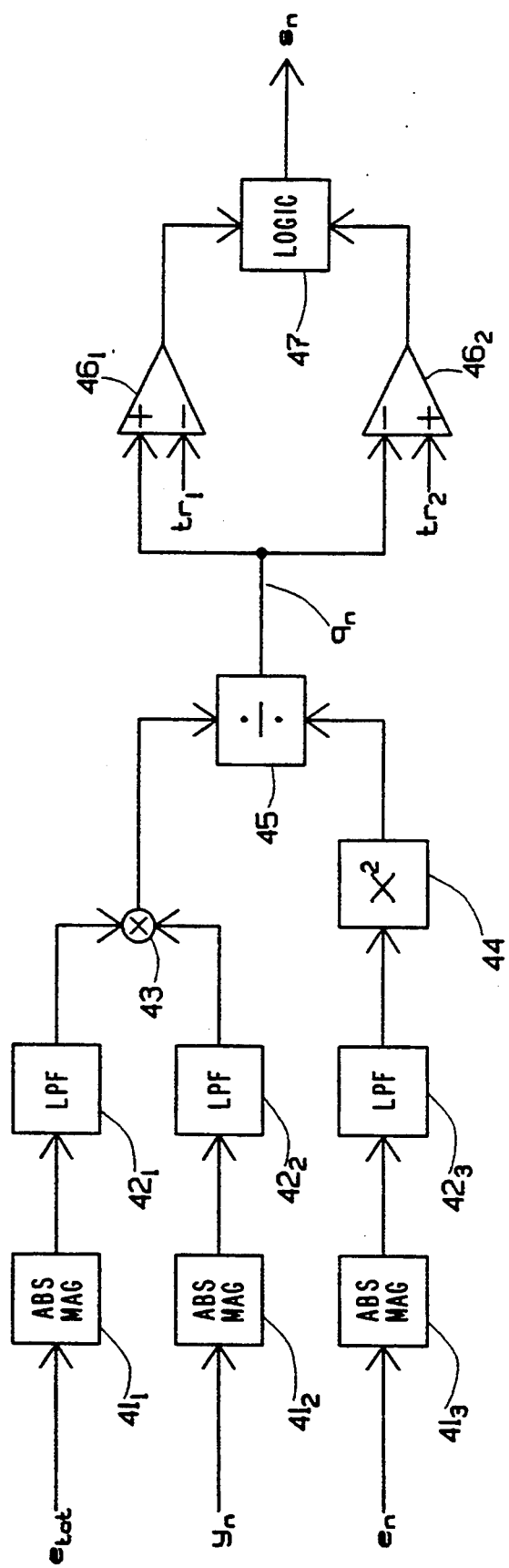
FIG. 4 illustrates a device for providing control signals for one of a number of switches included in the inventive echo canceller.

FIG. 4 illustrates an example of an arrangement for forming control signals for one of the switches 32 illustrated in FIG. 3. Thus, one such arrangement is required for each filter included in the echo canceller according to FIG. 3. The echo-reduced signal $e_{tot}$, the filter output signal $Y_n$ and the filter error signal $e_n$ are applied to the arrangement illustrated in FIG. 4. The absolute magnitude of some of the signals is formed in absolute magnitude forming means $41_1$-$41_3$. Each of the signals is then filtered in its respective lowpass filter means $42_1$-$42_3$. The signals deriving from the signals $e_{tot}$ and $y_n$ are multiplied together in a multiplier 43, thereby forming the signal $|e_{tot}|*|y_n|$. The signal deriving from the signal $e_n$ is squared in a quadrating means 44, to form the signal $|e_n|*|e_n|$. The signal from the multiplier 43 is divided by the signal from the quadrating means 44 in a division means 45. The aforesaid quality measurement is thereby formed, this measurement being referenced $q_n$. When ignoring the absolute magnitude formations, the quality measurement will obtain the value $q_n=(e_{tot}/e_n)*(Y_n/e_n)$.

The quality measurement $q_n$ is applied to an input of a comparator $46_1$ and to an input of a comparator $46_2$. The quality measurement is compared in the comparator $46_1$ with a threshold value $tr_1$ for enabling the filter concerned, while the quality measurement is compared in the comparator $46_2$ with a lower threshold value $tr_2$ for disenabling the filter. The output signals of the comparators are applied to a logic means 47 which generates a control signal $s_n$ and delivers the signal to the filter. For instance, a logic one is generated when the filter shall be enabled, and a logic zero is generated when the filter shall be disenabled.

As before mentioned, however, it is not necessary to disenable an enabled filter during an ongoing call. The comparators 46 and the logic means 47 can therefore be modified accordingly, meaning that the comparator $46_2$ can be omitted, among other things.

The quality measurement of the filter which is able to cancel the greatest echo will be the first filter to exceed the threshold value $tr_1$. This is because the filter in question, e.g. filter $31_1$, will have a relatively large output signal, $y_1$, and a relatively small error signal, $e_1 = -d - y_1$. As a result of enabling or coupling-in the first filter, the error signals for the remaining filters will decrease by the value of the output signal $y_1$ of the enabled filter, since this output signal is subtracted from the echo-included signal d in the subtraction means 36. The quality measurements of the remaining filters will therewith increase. Correspondingly, the error signals of those filters that are not enabled will, of course, also decrease for each new filter that is enabled after the first enabled filter, whereby the quality measurement of the not-enabled filters will increase successively. Thus, it can be said that the smaller echo will be initially hidden by the larger echoes. Filters which are unable to perform useful work of any consequence, i.e. filters which are only able to cancel relatively small echoes receive, however, output signals which are so small that their quality measurements will never exceed the filter enabling threshold value $tr_1$. Such filters will therefore never be enabled.

When a filter is enabled, its quality measurement will decrease slightly, owing to the fact that the signal $e_{tot}$ on the line 34 is reduced by the filter output signal. However, disenablement of a filter as a result of a decreased quality measurement can be prevented by appropriate dimensioning of the filter enabling threshold value $tr_1$ and the filter disenabling threshold value $tr_2$.

However, the quality measurement can also be calculated in a way different from that proposed above. Conceivable methods in this regard are those in which only the output signal of the filter, e.g. $y_1$, is divided by the filter error signal, e.g. $e_1$, or in which solely the coefficient values of the filter are investigated. This latter can be effected, for instance, by forming the sum of the absolute magnitudes of the coefficient values or of the squares of said coefficient values. Naturally, suitable proportionality constants can also be inserted when calculating the quality measurements. It is also conceivable to calculate the quality measurements for enabled filters in a different way to that of calculating the quality measurements for not-enabled filters. However, irrespective of the manner in which the quality measurement is calculated, the quality measurement will always disclose the importance of the filter in question to the current echo cancellation, i.e. it constitutes a measure of the useful work that the filter is able to perform or perhaps has already performed in echo cancellation.

Since only those filters which perform useful work in cancelling echoes are enabled to diminish the echo, there is obtained a rapid convergence, at least in most cases. However, echo cancellation will always be effective, since all enabled filters receive identical error signals. Consequently, the convergence of one individual filter will not be influenced by the echo that should actually be cancelled by another filter. This means that all error signals will be small. Furthermore, in practice, a sufficient number of filters will always be enabled, which means that echoes which have long impulse responses can also be cancelled. Naturally, the number of filters that are enabled will depend on the echo concerned. It can be mentioned that when all filters are enabled, this corresponds to the use of one single long filter. As will be apparent from the aforegoing, such a filter is unnecessary, other than in exceptional circumstances, since the convergence time would, in general, be unnecessarily long.

It may be convenient to use 8 or 16 cascade-connected filters. If the maximum number of filter taps is to be 512, each of the filters will then be required to have 64 or 32 taps.

As mentioned in the aforegoing, a rapid convergence can be replaced with a stable and secure convergence, and consequently it is possible with the present invention to obtain a stable and secure convergence which, at the same time, is at least relatively rapid.

The invention is not restricted to the aforedescribed and illustrated exemplifying embodiment thereof, since modifications can be made within the scope of the following claims. In addition to the aforesaid modifications, it is conceivable, for instance, to use a single arrangement according to FIG. 4 in common with all filters. This arrangement could then be used in accordance with a time multiplex principle and form control signals for one switch at a time. When filters which have already been enabled shall constantly remain enabled during an ongoing call, it is, of course, unnecessary to calculate newquality measurements for those filters that are already enabled.

Naturally, it may be convenient in practice to allow the aforedescribed functions to be performed in a digital signal processor instead of in the separate means illustrated in the Figures. Such digital signal processing is per se normal in conjunction with adaptive echo cancellation.

What is claimed is:

1. In an echo canceller having a plurality of cascade-connected adaptive filters, wherein each adaptive filter generates a respective filter output signal for cancelling a respective part of an echo signal appearing on a line in a four-wire loop, and the adaptive filters are updated based on updating signals produced in an initial state of a converging process by subtracting the filter output signals from an echo-included signal which contains the echo signal and which appears on the line, a method for cancelling echoes comprising the steps of:

determining respective quality measurements for the adaptive filters, each quality measurement representing a contribution of the respective adaptive filter to echo cancellation;

selecting at least one of the adaptive filters based on the quality measurements;

using the selected adaptive filters to generate an echo-reduced signal which is a difference between the echo-included signal and a signal representing a sum of the filter output signals of the selected filters;

using the echo-reduced signal as the updating signals for the selected adaptive filters; and generating the updating signals for the remaining adaptive filters by subtracting the filter output signals of the remaining adaptive filters from the echo-reduced signal.

2. The method of claim 1, wherein the quality measurements are determined by a function of the filter output signals and the updating signals.

3. The method of claim 2, wherein the quality measurements are also determined by a function of the echo-reduced signal.

4. The method of claim 1, wherein the quality measurements are determined by a function of coefficient values of the adaptive filters.

5. The method of claim 1, wherein the selecting step includes the steps of comparing each of the quality measurements with a predetermined value and selecting the adaptive filters having quality measurements that exceed the predetermined value.

6. An echo canceller comprising:

a plurality of cascade-connected adaptive filters, wherein each adaptive filter has an output terminal and generates a respective filter output signal for cancelling a respective part of an echo signal which appears on a line included in a four-wire loop, and the adaptive filters are updated in response to respective updating signals produced in an initial state of a converging process by subtracting the filter output signals from an echo-included signal containing the echo signal and appearing on the line;

means for determining a respective quality measurement for each of the adaptive filters, each quality measurement representing a contribution of the respective adaptive filter to echo cancellation;

switching means, in each of the adaptive filters, for connecting the respective adaptive filter's output terminal with one of a predetermined first point and second point based on the respective quality measurement;

means for generating on the line an echo-reduced signal. which is a difference between the echo-included signal and a sum of the filter output signals of the adaptive filters having output terminals ,connected to the first point; and means, in each of the adaptive filters, for generating the respective updating signal which is the echo-reduced signal when the output terminal of the respective adaptive filter is connected to the first point and which is a difference between the echo-reduced signal and the respective adaptive filter's output signal when the output terminal of the respective adaptive filter is connected to the second point.

7. The echo canceller of claim 6, wherein the generating means includes a subtractor having a positive input connected to the line and a negative input connected to the second point.

8. The echo canceller of claim 6, wherein the determining means determines the quality measurements according to a function of the filter output signals and the updating signals.

9. The echo canceller of claim 8, wherein the determining means also determines the quality measurements according to a function of the echo-reduced signal.

10. The echo canceller of claim 6, wherein the determining means determines the quality measurement according to a function of coefficient values of the adaptive filters.

11. The echo canceller of claim 6, further comprising means, connected to the determining means, for generating control signals based on the quality measurements and for applying the control signals to the switching means, wherein the control signal generating means includes threshold value detectors and logic which generate a first value of the control signal when a respective adaptive filter's quality measurement exceeds a predetermined value, and each of the switching means connects the output of its respective adaptive filter to the first point when the control signal has the first value.

* * * * *